R. P. PACKARD.
GUM BOX.
APPLICATION FILED FEB. 15, 1917.

1,244,363.

Patented Oct. 23, 1917.

WITNESSES:
F. C. Matheny
W. W. Boulton

INVENTOR
RAYMOND. P. PACKARD
BY
Cook + Matheny
ATTORNEY

UNITED STATES PATENT OFFICE.

RAYMOND P. PACKARD, OF TACOMA, WASHINGTON.

GUM-BOX.

1,244,363.      Specification of Letters Patent.      Patented Oct. 23, 1917.

Application filed February 15, 1917. Serial No. 149,136.

*To all whom it may concern:*

Be it known that I, RAYMOND P. PACKARD, a citizen of the United States, residing at Tacoma, in the county of Pierce and State of Washington, have invented a new and useful Improvement in Gum - Boxes, of which the following is a specification.

This invention relates to improvements in gum boxes and the object of this improvement is to provide a light durable and inexpensive box or case of neat and attractive appearance that is of the correct shape and size to receive wrapped sticks of gum and is provided with novel and easily operated devices whereby the sticks of gum may be removed from the box one at a time without opening the box.

The invention consists in the novel construction, adaptation and combination of parts of a gum box as will be more clearly described in the following specification, illustrated in the accompanying drawings and finally pointed out in the appended claims.

Figure 1:
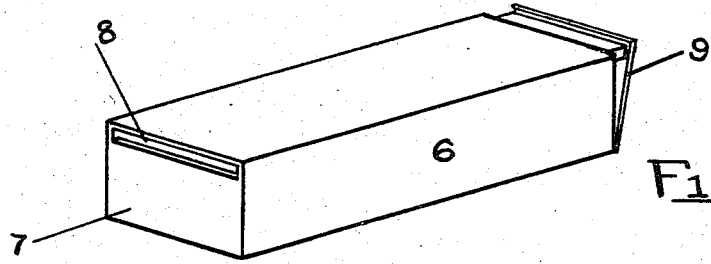
Figure 2:
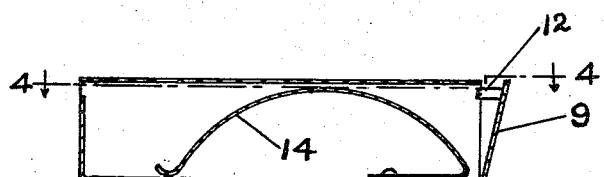
Figure 4:
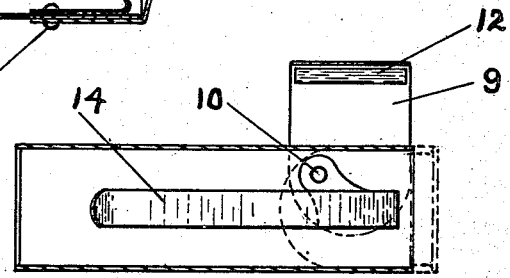
Figure 3:
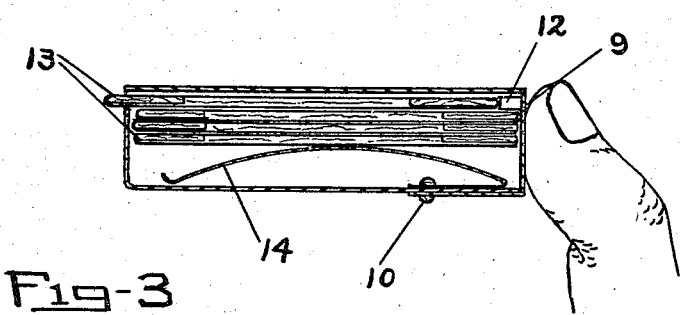

In the drawings Figure 1 is a view in perspective of a gum box constructed in accordance with this invention; Fig. 2 is a view in longitudinal vertical section of the same; Fig. 3 is a view similar to Fig. 2 showing the box filled with gum and illustrating the manner of extracting the gum from the box and Fig. 4 is a view in horizontal cross section on broken line 4, 4 of Fig. 2 showing the manner of opening one end of the box so it may be filled.

Referring to the drawings throughout which like references indicate like parts the numeral 6 indicates a box of substantially square cross section and sufficient length to receive an ordinary wrapped stick of gum.

The case 6 is closed on the end 7 except for a transverse slot 8 near the top thereof that is just wide enough to permit one stick of gum to pass therethrough.

The opposite end of the box is left open when the box is constructed and is normally adapted to be closed by an angularly shaped spring member 9 that is secured to the bottom of the box by a rivet 10 and extends upwardly over the end of the box at an angle that is inclined away from the box from bottom to top thereof as shown in Figs. 1 and 2.

The spring member 9 is provided on its top end with an inwardly directed flange or plunger 12 that is adapted to enter the box, as shown in Fig. 3, and move the uppermost stick 13 of gum endwise through the slot 8.

The interior of the box is provided with a flat spring 14 that is secured on the rivet 10 and is adapted to hold the sticks of gum 13 upwardly against the top of the box.

As illustrated in Fig. 4 the rivet 10 is located to one side of the center of the box so that the spring member 9 may be freely turned around to one side of the box thus leaving the end open so that gum may be inserted therethrough.

The box is preferably designed to hold the five or six sticks, which constitute an ordinary package of chewing gum and when carried in the pocket will protect such gum from dirt, heat and moisture and prevent them from becoming broken.

The box may be filled by turning the spring member 9 sidewise and inserting the several sticks above the spring 14 and the sticks of gum may be removed one at a time by exerting a pressure on the spring member 9 as shown in Fig. 3 thus pushing the end of the top stick outwardly through the slot 8 far enough so that it may easily be grasped with the fingers and removed from the box.

The box is small and light and may be plated if desired to give it an attractive external appearance.

The spring 14 holds the sticks of gum upwardly in line with the slot 8 and plunger 12 and also prevents the sticks of gum from rattling within the box.

It is obvious that changes in the form of construction of the various parts embodied in this invention may be resorted to within the scope of the following claims.

What I claim and desire to protect by Letters Patent is:

1. The combination with a box having a slot in one end and adapted to contain a plurality of sticks of gum, of a spring to hold said sticks of gum in contact with one side of said box, and a single spring member constituting one end of said box for moving said sticks of gum outwardly through said slot one at a time in response to an external pressure.

2. The combination with a box having a slot in one end and adapted to contain a plurality of sticks of gum, of means for holding said sticks of gum against a wall of said box whereby the outermost one of said sticks will be in alinement with said slot, and a spring member on the opposite end of said box constituting the end that is adapted to be opened for the insertion of said gum, said spring member having a plunger adapted to engage the outermost stick of gum and move it outwardly through said slot in response to an external pressure.

3. The combination with a gum box having a slot in one end, of means for holding sticks of gum against one side of said box in alinement with said slot, and an angular spring member pivoted to one side of said box and adapted to extend over the end thereof said spring member having a flange adapted to engage with and move a stick of gum outwardly through said slot in response to an external pressure and the pivot of said spring member being located at one side of the center of said box to permit said spring member to be turned sidewise and open the end of said box.

Signed by me at Tacoma, Washington, this 6th day of February, 1917.

RAYMOND P. PACKARD.

Witnesses:
F. C. MATHENY,
R. J. COOK.